COMFORT CONTROL CIRCUIT

Filed Sept. 4, 1962

INVENTOR.
Harold E Robb Jr.
BY
ATTYS.

United States Patent Office 3,118,601

Patented Jan. 21, 1964

3,118,601
COMFORT CONTROL CIRCUIT

Harold E. Robb, Jr., Elk Grove, Ill., assignor to Powers Regulator Company, Skokie, Ill., a corporation of Illinois Filed Sept. 4, 1962, Ser. No. 221,128
9 Claims. (Cl. 236—44)

The present invention relates to a multiple sensing control circuit and particularly to a circuit useful for controlling environmental conditions responsive to the sensing of environmental humidity and temperature.

It is an object of the present invention to provide a new and improved feedback control circuit of simple, compact and inexpensive design.

A more specific object of the invention is to provide a new and improved trigger control circuit wherein the triggering level is determined mutually by amplitude modulating a fixed frequency signal and by varying the base bias thereof.

A specific object of the invention is to provide a new and improved circuit for feeding an input control signal to a trigger circuit wherein the input control signal is made up of a combined amplitude modulated fixed frequency signal and a variable bias signal.

A further specific object of the invention is to provide a transistorized Schmitt trigger circuit for operating a temperature controller, and a feedback input to the trigger circuit including a humidity sensor for amplitude modulating an alternating current signal and a temperature responsive device for varying the bias component applied to the trigger circuit whereby the temperature controller is selectively operated to adjust the environment in which the sensing devices are located to a level determined jointly by the humidity and temperature therein.

Further objects and features of the invention pertain to the particular arrangement and structure whereby the above identified objects are attained.

Figure 1:
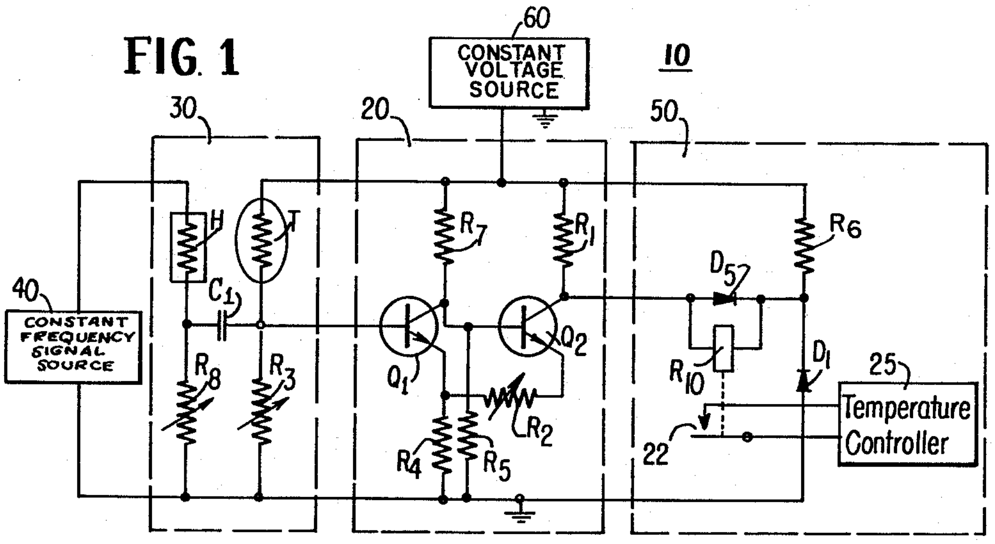
Figure 2:
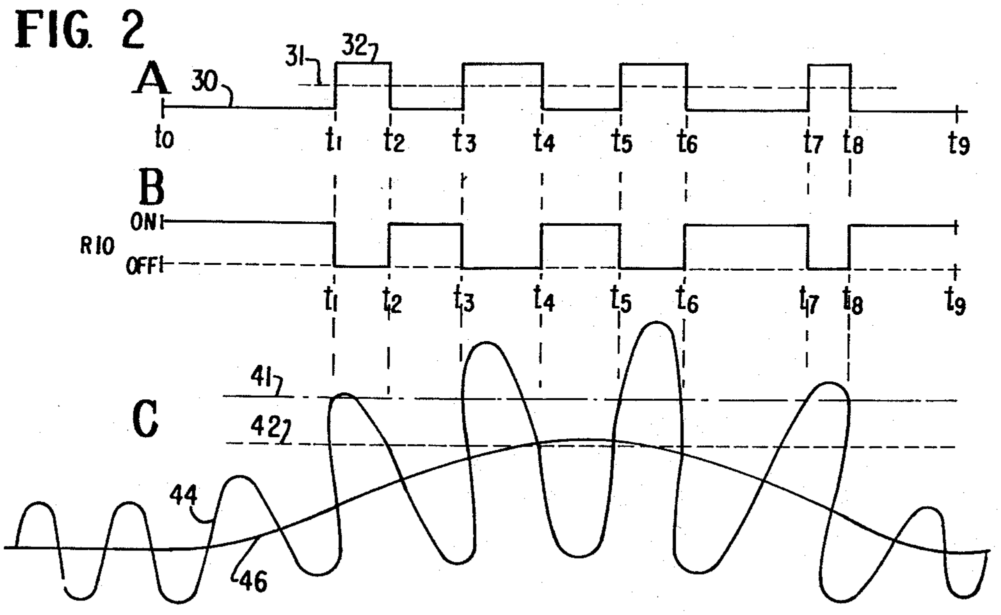

The invention, both as to its construction and mode of operation will be better understood by reference to the following specification and drawings, forming a part thereof, wherein:

FIGURE 1 is a schematic representation of a control circuit in accordance with the invention; and, FIGURE 2 shows plots of environmental voltages and wave forms that may occur within the circuit of FIGURE 1.

Referring now to the drawings, there is shown in FIGURE 1 a control circuit 10 including a Schmitt trigger circuit 20, a bias control circuit 30, a constant frequency variable alternating current voltage source 40, an output device 50 and a constant voltage source 60. The Schmitt trigger circuit 20 includes a transistor Q1 and a transistor Q2 each of the NPN type and biasing resistors R1, R2, R4, R5 and R7. The biasing control circuit 30 includes a thermistor T, humidity transducer H, the resistors R3 and R8, and a capacitor C1. Their source 40 may be of any suitable kind providing wave forms as may be deemed preferred in the use of the circuit. For the purposes of the present discussion it is considered that the source 40 provides an alternating current wave form to the biasing control circuit 30.

The output circuit 50 includes a relay winding R10 in parallel with a by-pass diode D5, a load resistor R6 and a temperature compensating germanium diode D1. The relay R10 includes the contacts 22 which are connected in a series loop with a temperature controller 25 such as a furnace or air conditioner, or both.

The Schmitt trigger circuit 20 is a regenerative bistable circuit whose state depends upon the amplitude of the input voltage applied thereto whereby it is capable of providing, alternately, a high voltage or a low voltage as illustrated in FIGURE 2(A). The input to the trigger circuit 20 is derived from the control circuit 30, and consists of two independent inputs, one a D.C. bias determined by the voltage dividing network including a thermistor T and the adjustable resistor R3 and the other being an alternating current input determined by the voltage divider made up of the humidity transducer H and an adjustable resistor R8. The D.C. voltage dividing network is connected across the direct current voltage supply 60 and associated with the Schmitt trigger circuit 20 and the alternating current voltage divider circuit is connected across the constant frequency signal source 40. A coupling capacitor C1 is connected between the junction of the humidity transducer H and the variable resistor R8 and the junction of the thermistor T and the variable resistor R3 for purposes of isolating the alternating currents circuit from the direct current signal. When the alternating current source is applied to the circuit it appears obvious that there is presented at the junction between the thermistor T and the variable resistor R3 a conjoint biasing signal made up of an alternating current component dependent upon the setting of the variable resistor R8 and the condition sensed by the humidity transducer H, and also a D.C. signal dependent upon the setting of the resistor R3 and the condition sensed by the thermistor T. The signal so appearing at the junction between the thermistor T and the variable resistor R3 is the input signal to the Schmitt trigger circuit 20.

In the Schmitt trigger circuit 20 the collector of the transistor Q1 is connected via the resistor R7 to the positive potential source 60 and also to the base electrode of the transistor Q2. The emitter electrode of the transistor Q1 is connected to ground potential via the resistor R4 and also to the emitter electrode of the transistor Q2 via the variable resistance R2. The base electrode of the transistor Q2 is biased to ground potential via the resistor R5. The collector electrode of the transistor Q2 is connected to positive potential 60 via the resistor R1 and is also extended to the load circuit 50. In the arrangement shown the values of the resistors are chosen so that in a first operating condition of the Schmitt trigger circuit with, for example, the transistor Q1 nonconductive, the base to emitter voltage of the transistor Q2 is positive and the base to emitter voltage of the transistor Q1 is negative. The emitter electrodes of Q1 and Q2 may be at the same potential assuming that the variable resistance of the resistor R2 is zero or they may be at a different voltage as resistance is inserted into the variable resistor R2. The resistor R2 provides a means by which the inherent switching differential of the trigger circuit may be varied to optimize control action to the particular application. The critical voltage for the Schmitt trigger circuit is of course the emitter voltage of the transistor Q1. For as soon as the base voltage or the input voltage to Q1 becomes equal to or slightly positive to the emitter voltage, the one will conduct thereby increasing the voltage drop across the resistor R7 and substantially reducing the current flow through the resistor R5. Accordingly, the base to emitter potential of the transistor Q2 becomes negative and that transistor is turned off.

The second stable condition is maintained until a critical turn-off voltage is achieved at the base of the transistor Q1 whereupon Q1 becomes non-conductive and the transistor Q2 becomes conductive. The critical voltages for rendering the transistor Q1 conductive and non-conductive are shown respectively by the comparative lines 41 and 42. The voltage at the base electrode of the transistor Q1 is represented by the line 44 and the D.C. bias component thereof is represented by the line 46. As the voltage 44 increases by virtue of the change in the potential 46 and the amplitude modulation of the alternating current wave from the source 40 and assuming that the state of the Schmitt trigger circuit is such that the transistor Q1 is non-conducting and the transistor Q2 is conducting, no change occurs in the state of the Schmitt circuit until the input voltage 44 on the base of the transistor Q1 reaches a voltage level represented by the line 41. Thereupon the base to emitter voltage at transistor Q1 becomes positive and the latter is rendered conductive thereby rendering the transistor Q2 non-conductive. This conductive state is maintained until the voltage 44 decreases to a level represented by the voltage 42, at which time the base to emitter voltage of the transistor Q1 becomes negative and is turned off rendering the transistor Q2 conductive. The same action continually occurs as the input voltage 44 varies above and below the voltage levels represented by the lines 41 and 42. Accordingly, there appears in the output of the Schmitt trigger circuit and at the collector electrode of the transistor Q2 a rectangular wave form of variable time duration as shown in FIGURE 2(A).

As the voltage at the collector electrode of the transistor Q2 increases from level 30 to amplitude 32 as shown in FIGURE 2(A), the voltage across the winding of relay R10 decreases at the same time and as that voltage level gets beyond the operating voltage 31 the relay R10 is de-energized to open contacts 22 associated therewith as shown in FIGURE 2(B). Thus, there is completed at the contacts 22 a circuit for deenergizing the temperature controller 25. The controller remains de-energized as long as the output voltage from the Schmitt trigger circuit is maintained at a level above the voltage 31 and in the particular instance illustrated the heater 24 is de-energized between the intervals $t_1$ and $t_2$, $t_3$ and $t_4$, $t_5$ and $t_6$, and $t_7$ and $t_8$.

From the exemplary illustration it is clear that the bias line 46 in FIGURE 2(C) represents a circumstance in which the temperature in the environment is increasing between the time $t_0$ and approximately $t_4$ and then decreasing between the time $t_4$ and the time $t_9$. This increase in temperature is effective for causing a corresponding decrease in the heating provided from the temperature controller 25. With regard to the input voltage represented by the line 44, as the humidity in the environment increases so also does the amplitude of the alternating current wave. This in turn causes an increase in the non-operating interval of the temperature controller 25 whereby the temperature is decreased to compensate for the increase in humidity and to maintain the comfort within the environment relatively constant.

Although the arrangement has been described herein as including sensor devices detecting humidity and temperature and operating therefrom a heater or temperature controller device, it is understood that other variations may be made therein and other controls may be provided.

From the foregoing it is clear that there has been presented herewith a new and improved circuit for regulating the comfort level in an enviroment by detecting the humidity and the temperature therein and utilizing a composite control signal derived therefrom for purposes of producing a controlled switching action in a bi-stable circuit. An appropriate humidity transducer for use is one of a number of commercially available devices for which the resistance decreases as humidity increases and the thermistor device is a conventional temperature responsive resistor having a characteristic wherein resistance decreases as temperature increases. The source 40 although described herein as providing an alternating current wave form, may be of a kind to provide for example a sawtooth wave form or a truncated sawtooth wave form, the former of which is useful for providing time proportioning control and the latter of which is useful for time proportional control and "on-off" operation of a controller system.

The arrangement disclosed herein is at present considered to be preferred and it is understood that variations might be made therein by those skilled in the art. It is intended to cover in the appended claims all such modifications and variations as fall within the true spirit and scope of the invention.

I claim:

1. A control circuit for a load device comprising a bistable trigger circuit responsive to an input signal greater than a predetermined amplitude for providing an output signal of a first amplitude and responsive to an input signal less than a predetermined amplitude for providing an output signal of a second amplitude, means for providing a variable bias in accordance with a first sensed condition, a constant frequency signal source, means for amplitude modulating said constant frequency signal in accordance with a second sensed condition, and means for combining said variable bias and said amplitude modulated constant frequency signal to provide an input signal to said bi-stable trigger circuit.

2. A control circuit for regulating conditions in an environment comprising a bi-stable trigger circuit responsive to an input signal greater than a predetermined amplitude for providing an output signal of a first amplitude and responsive to an input signal less than a predetermined amplitude for providing an output signal of a second amplitude, a load device operative responsive to a first amplitude output signal for regulating conditions in the environment, first means providing a bias varying inversely with a sensed first condition in the environment, a constant frequency signal source, second means for amplitude modulating said constant frequency source inversely with a sensed second condition in the environment and means for combining said variable bias and said amplitude modulated constant frequency signal to provide an input signal to said bi-stable trigger circuit variable about said predetermined amplitude.

3. A control circuit for regulating a comfort index in a closed environment comprising a bi-stable trigger circuit responsive to an input signal greater than a predetermined amplitude for providing an output signal of a first amplitude and responsive to an input signal less than a predetermined amplitude for providing an output signal of a second amplitude, a load device operative responsive to a first amplitude output signal for regulating a first of two interrelated conditions in said environment, first means providing a bias varying inversely with a sensed first condition in the environment, a constant frequency signal source, second means for amplitude modulating said constant frequency source inversely with a sensed second condition in the environment and means for combining said variable bias and said amplitude modulated constant frequency signal to provide an input signal to said bi-stable trigger circuit variable about said predetermined amplitude, whereby said load device operates to change said first condition inversely to the change in the sensed first condition and operates to change said first condition inversely with the change in the sensed second condition.

4. A control circuit for regulating conditions in an environment comprising a bi-stable trigger circuit responsive to an input signal greater than a predetermined amplitude for providing an output signal of a first amplitude and responsive to an input signal less than a predetermined amplitude for providing an output signal of a second amplitude, a load device operative responsive to a first amplitude output signal for regulating conditions in the environment, a constant amplitude signal source, a first voltage divider connected across said constant amplitude signal source including a resistance that varies inversely with changes in a first condition in the environment whereby a first signal is provided therefrom varying directly with changes in said first condition, a constant frequency signal source, a second voltage divider connected across said constant frequency signal source and including a resistance that varies inversely with changes in a second condition in the environment whereby a second signal is provided therefrom that is amplitude modulated directly with changes in said second condition, and means for additively combining said first signal and said second signal to provide an input signal to said bi-stable trigger circuit variable about said predetermined amplitude, whereby said load device operates to change said first condition inversely to the change in the sensed first condition and operates to change said first condition inversely with the change in the sensed second condition.

5. A control circuit for regulating conditions in an environment comprising a bi-stable regenerative trigger circuit responsive to an input signal greater than a predetermined maximum amplitude for providing an output signal of a first amplitude and responsive to an input signal less than a predetermined minimum amplitude for providing an output signal of a second amplitude, a load device operative responsive to a first amplitude output signal for regulating conditions in the environment, a constant amplitude signal source, a first voltage divider connected across said constant amplitude signal source including a resistance that varies inversely with changes in a first condition in the environment whereby a first signal is provided therefrom varying directly with changes in said first condition, a constant frequency signal source, a second voltage divider connected across said constant frequency signal source and including a resistance that varies inversely with changes in a second condition in the environment whereby a second signal is provided therefrom that is amplitude modulated directly with changes in said second condition, and capacitive coupling means between said first and second voltage dividers for additively combining said first and second signals to provide an input signal to said bi-stable trigger circuit variable about said predetermined maximum amplitude and said predetermined minimum amplitude, whereby said load device operates to change said first condition inversely to the change in the sensed first condition and operates to change said first condition inversely with the change in the sensed second condition.

6. A control circuit for regulating a comfort index in a closed environment comprising, a bi-stable regenerative trigger circuit responsive to an input signal greater than a predetermined maximum amplitude for providing an output signal of a first amplitude and responsive to an input signal less than a predetermined minimum amplitude for providing an output signal of a second amplitude, a load device operative responsive to a first amplitude output signal for regulating the temperature condition in said environment, a constant amplitude signal source, a temperature responsive resistor for which the resistance varies inversely with change in temperature, a first voltage divider connected across said constant amplitude signal source and including said temperature responsive resistor whereby a first signal is provided therefrom varying directly with changes in said temperature condition, a constant frequency signal source, a humidity responsive resistor for which the resistance varies inversely with changes in humidity, a second voltage divider connected across said constant frequency signal source and including said humidity responsive resistor whereby a second signal is provided therefrom that is amplitude modulated directly with changes in said humidity condition, and capacitive coupling means between said first and second voltage dividers for additively combining said first and second signals to provide an input signal to said bi-stable trigger circuit variable about said predetermined maximum amplitude and said predetermined minimum amplitude, whereby said load device operates to vary said temperature condition inversely with changes in the sensed temperature condition and operates to vary said temperature condition inversely with changes in the sensed humidity condition.

7. The control circuit as set forth in claim 6 wherein said constant frequency signal source provides a periodic voltage wave form.

8. The control circuit as set forth in claim 7 wherein said periodic voltage wave form is a sawtooth wave.

9. The control circuit as set forth in claim 7 wherein said periodic wave form is an alternating current wave.

References Cited in the file of this patent

UNITED STATES PATENTS

| | | |
|---|---|---|
| 2,629,054 | Craig | Feb. 17, 1953 |
| 2,913,902 | Ross | Nov. 24, 1959 |
| 2,994,759 | Lipman | Aug. 1, 1961 |